Patented Aug. 25, 1953

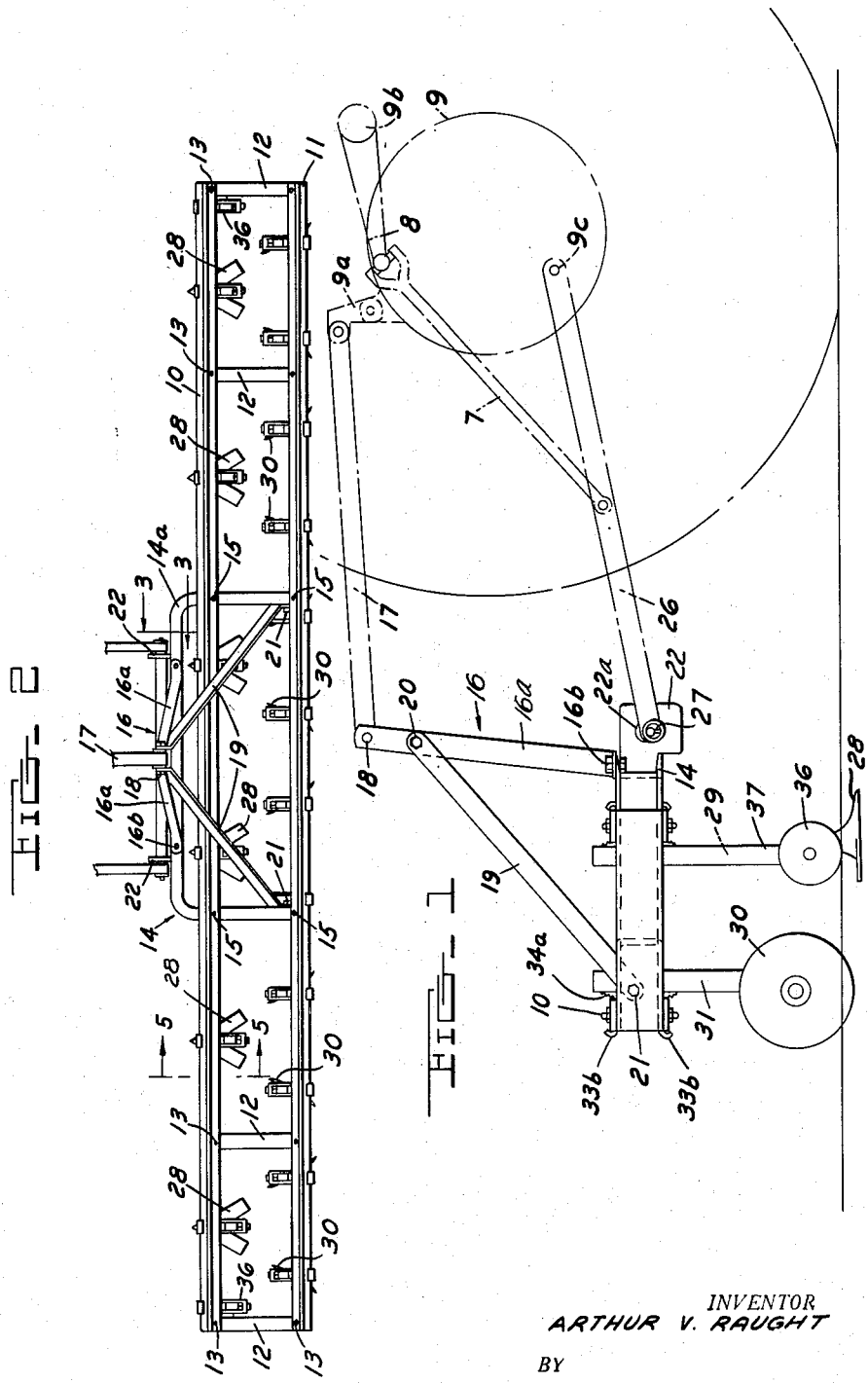

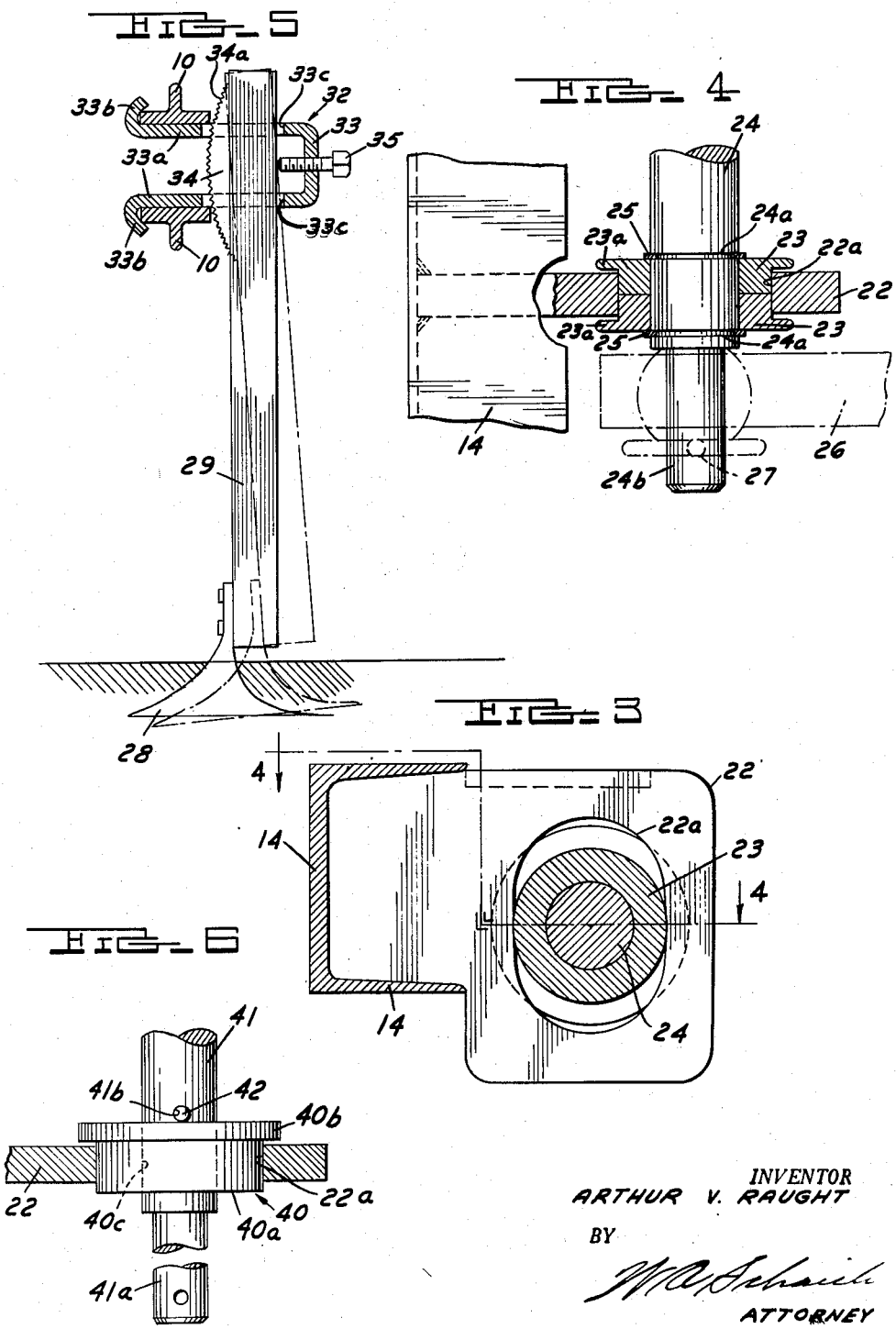

2,649,722

UNITED STATES PATENT OFFICE 2,649,722

NONRIGID FRAME MOUNTING FOR LIFT TYPE IMPLEMENTS

Arthur V. Raught, Birmingham, Mich., assignor to Dearborn Motors Corporation, Highland Park, Mich., a corporation of Delaware Application May 6, 1950, Serial No. 160,504

4 Claims. (Cl. 97—47.62)

This invention relates to an improved implement frame for connecting a lift type implement to a tractor.

Various farm implements, and particularly cultivators and planters for row crop work, are frequently of considerable width in order to operate on a plurality of rows with one pass of the tractor carrying the implement. Obviously, it is advantageous to utilize such a wide cultivator or planter because of the time saved and economy gained in cultivating or planting a plurality of rows in a single operation. In connection with the use of wide, lift type implements of known construction, several disadvantages have appeared. Due to the customary rigid mounting of the implement on the tractor, any slight variations in the ground contour which cause an up and down movement of the rear tractor wheels will therefore adversely affect the implement because such implement will tilt from side to side, thereby causing the ground working tools to dig deeply in the ground on one end while not touching the ground on the opposite end.

Accordingly, it is an object of this invention to provide an improved frame for a lift type implement which permits non-rigid mounting on the tractor but does not interfere with the liftability of the implement.

The specific nature of this invention, as well as other objects and advantages thereof, will become apparent to those skilled in the art from the following detailed description, taken in conjunction with the attached sheets of drawings on which, by way of preferred example only, is illustrated two embodiments of this invention.

On the drawings:

Figure 1 is a side elevational view showing a cultivator embodying this invention mounted on the power lifted draft links of a tractor.

Figure 2 is a plan view of the improved cultivator.

Figure 3 is an enlarged sectional detail view taken on the plane 3—3 of Figure 2.

Figure 4 is a sectional view taken along the plane 4—4 of Figure 3.

Figure 5 is an enlarged detail view taken along the plane 5—5 of Figure 2.

Figure 6 is an enlarged detail view of a modified bearing construction for the drawbar ends.

As shown on the drawings:

As applied to a cultivator, the implement frame of this invention comprises two pairs of aligned, vertically spaced T-section bars 10 and 11 arranged in transversely spaced, parallel relationship, as best shown in Figure 2, and held in such position by a plurality of channel shaped spacing members 12 secured to the respective pairs of T-bars 10 and 11 by bolts 13. A horizontal U-shaped frame 14 constructed of channel iron is secured centrally of the T-bars 10 and 11 by bolts 15 as shown in Figure 2. The bight portion 14a of such U-shaped frame projects forwardly from the leading pair of T-bars 10, and upon the top surface of the bight portion 14a there is provided an A-frame 16 comprising a pair of upwardly sloping strap members 16a bolted at transversely spaced points to such bight portion as at 16b. Strap members 16a are spaced apart at their upper ends to receive a tractor top link 17 which is pivotally connected to the upper ends of each strap member 16a by a transverse bolt 18. A pair of rearwardly and downwardly sloping braces 19 are respectively connected at their upper ends to strap members 16a by a transverse bolt 20. The lower ends of braces 19 are connected respectively to the arms of U-shaped frame 14 by transverse bolts 21.

A pair of vertically disposed, transversely spaced lugs 22 are secured by welding to the forwardly facing edge of the bight portion 14a of frame 14. A transverse, vertically elongated aperture 22a is provided in each forwardly facing lug 22 and a pair of bearing members 23 are slidably mounted in each aperture 22a. Bearing members 23 are cylindrical disc-like members each having a radial flange 23a at one end. Bearing members 23 are respectively insertable in aperture 22a from opposite ends and are located with flanges 23a respectively adjacent the corresponding faces of lug 22. When the bearing members 23 are assembled in aperture 22a as shown in Figures 3 and 4, the inserted ends of such members are in intimate contact, and such bearing members are free to slide vertically within aperture 22a.

The ends of a cylindrical drawbar 24 are mounted in bearing members 23 for supporting such drawbar transversely of lugs 22. A pair of axially spaced annular grooves 24a are provided near each end of drawbar 24 and are respectively adjacent the opposite faces of each bearing member 23 as shown in Figure 4. A snap ring 25 is insertable in each of the grooves 24a to secure bearing members 23 against displacement. Each end of drawbar 24 projecting beyond bearing 23 is of reduced diameter as shown at 24b to receive the end of a conventional trailing draft link 26 provided on a tractor 9 as shown in Figure 2.

In Figure 6 there is shown a modified bearing construction for supporting the ends of the drawbar in the vertically elongated aperture 23a provided in lugs 22. In this modification the bearing member 40 has a sleeve-like body portion 40a slidably insertable in slot 22a and is provided with a flange 40b of substantially larger diameter than the body portion 40a. Such flange abuts the inside face of lug 22 as shown in Figure 6. A drawbar 41 having a reduced diameter end portion 41a is inserted within the axial bore 40c provided in bearing body portion 40a. The projecting end 41a of drawbar 41 projects beyond the outside face of bearing member 40. A transverse hole 41b is provided in drawbar 41 adjacent the flange 40b of bearing member 40 and a pin 42 is pressed into such hole to hold the flange 40b snugly against the inside face of lug 22. As flange 40b abuts lug 22, such bearing member is secured against outward displacement through aperture 22a and pin 42 in drawbar 41 prevents axial displacement in the opposite direction. The reduced diameter end 41a of drawbar 41 mounts the respective trailing tractor draft link 26 thereon as in the above described construction.

Tractor 9 is a well-known type having a three link hitch arrangement comprising a top central link 17 pivotally connected to an upstanding lug 9a provided on the axle housing 9b of such tractor. Two draft links 26 are transversely spaced apart and are pivotally connected to axle housing 9b as at 9c and such draft links are vertically lifted by a pair of power actuated lift arms 8 respectively connected to links 26 by rods 7. Draft links 26 are respectively removably secured to the reduced diameter end portions 24b of drawbar 24 by a linch pin 27 inserted in suitable transverse apertures in the ends of drawbar 24.

As shown in Figures 1 and 2, a plurality of earth working implements are mounted on the cultivator frame on both the leading T-bars 10 and the trailing T-bars 11. A plurality of sweeps 28 are supported in depending relationship from bars 10 on standards 29 while a plurality of disc hillers 30 are supported in depending relationship from T-bars 11 by standards 31.

Standards 29 and 31 are each secured to the vertically spaced T-bars 10 or 11 by a clamping device 32, which is described and claimed in the copending application of Robert L. Erwin, Serial No. 158,250, now abandoned, filed April 26, 1950 and assigned to the assignee of this application. Such clamping device comprises a U-shaped clamp member 33 having arms 33a spaced apart as to permit the bight portion of such member to fit snugly between the vertically spaced T-bars 10 or 11, as shown in Figure 5. Each end of the arms of the U-shaped member 33 is reversely bent as shown at 33b to surround the horizontal edge of T-bars 10, as shown in Figure 5. A slot 33c is provided in each arm 33a of clamp member 33 and such slots are vertically aligned to admit standards 29 and 31. A segment shaped locking member 34 having a plurality of transverse V-shaped serrations 34a on the arcuate edge thereof is likewise inserted in slots 33c with the chord-like surface contiguous to the edge of the standard and the serrated edge contacting the rear edges of T-bars 10. A horizontally disposed screw 35 is screwed into a suitably threaded hole in the bight portion of clamping member 33 and such screw bears against the rear edge of standard 29 to force such standard forwardly and cause the rear edges of T-bars 10 to bite into the serrations 34a.

Loosening of screw 35 releases the tension on clamping member 33 whereby standards 29 can be readily and quickly adjusted along the length of T-bars 10. Adjustment in angularity of standards 29 and 31 is readily obtainable by rotating such standards fore or aft to angularly reposition locking member 34 relative to T-bars 10. When the desired degree of angularity is obtained, screw 35 is tightened to effectively lock the standard in the desired position of adjustment.

To prevent excessive vertical movement of the ends of the cultivator frame, a stabilizing wheel 36 may be rotatably secured to one end of a standard 37 and such standard is secured to the extreme end of the T-bars 10 as shown in Figure 2. The same clamping means as described for mounting of standards 29 to T-bars 10 is utilized for securing standards 37 in vertical, depending relationship to T-bars 10.

It will thus appear from the foregoing description that there is here provided a liftable cultivator frame which is non-rigidly mounted on the trailing draft and lifting links of a tractor, so that the cultivator will be maintained relatively stable in operation, that is, without excessive end play regardless of the vertical displacement of the rear tractor wheels, thereby insuring a uniform tillage of the soil between the crop rows.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of transversely spaced vertically swingable power lifted draft links, an implement frame, a pair of transversely spaced mounting brackets on said frame, each of said brackets having a vertically disposed slot, a bearing member in each of said slots constructed and arranged for vertical movement in said slots, said bearing members each having a transverse bore, a drawbar insertable in said bores for mounting said drawbar transversely of said brackets, and means for respectively connecting the draft links to the ends of said drawbar.

2. In a tractor drawn implement having a frame, the improvement comprising a pair of transversely spaced brackets secured to the frame, each of said brackets having a vertical slot, a pair of bearing members insertable in each of said slots for limited vertical movement, each pair of said bearing members defining a transverse bore, means on said bearing members for removably securing each pair of said bearing members in said slots, a drawbar insertable in said transverse bores, means for securing said drawbar against transverse movement relative to said bearing members, and means on said drawbar adapted for connection to the tractor to receive the draft forces thereof.

3. A drawbar hitch for a tractor drawn implement having a frame comprising a pair of transversely spaced mounting lugs secured on the frame, each of said lugs having a vertical slot, a pair of identical sleeve-like bearing members insertable in each of said slots for vertical movement therein, each pair of said bearing members defining a transverse bore, a peripheral flange on each bearing member constructed and arranged to lie adjacent a face of said lugs, a drawbar insertable in said transverse bores, means for securing said drawbar against transverse movement relative to said bearing members whereby said bearing members are retained in said slots and said drawbar is secured against lateral displacement, and means on said drawbar adapted for connection to the tractor to receive the draft forces thereof.

4. A self-levelling hitch for a lift type tractor carried implement having a frame, comprising a pair of transversely spaced vertical lugs on the frame, each of said lugs having a vertical slot, a flanged bushing member insertable in each of said slots for slidable vertical movement therein, each flange on said bushings being contiguous to one face of said lugs, a cylindrical drawbar mounted in said bushings and projecting laterally beyond said lugs, means on said drawbar for securing said drawbar and bushings against relative lateral displacement, and means on the ends of said drawbar adapted for connection to the tractor to receive the draft forces thereof.

ARTHUR V. RAUGHT.

References Cited in the file of this patent

UNITED STATES PATENTS

| Number | Name | Date |
| --- | --- | --- |
| 1,477,089 | Towner | Dec. 11, 1923 |
| 1,708,042 | Abbe | Apr. 9, 1929 |
| 1,718,780 | Dewey | June 25, 1929 |
| 1,900,440 | Ferguson | Mar. 7, 1933 |
| 1,916,945 | Ferguson | July 4, 1933 |
| 2,118,181 | Ferguson | May 24, 1938 |
| 2,140,144 | Silver | Dec. 13, 1938 |

FOREIGN PATENTS

| Number | Country | Date |
| --- | --- | --- |
| 589,917 | Great Britain | July 3, 1947 |